United States Patent

Chisholm et al.

[15] 3,645,837

[45] Feb. 29, 1972

[54] LAMINATES

[72] Inventors: Douglas S. Chisholm, Midland; Walter J. Schrenk, Bay City, both of Mich.

[73] Assignee: The Dow Chemical Company, Midland, Mich.

[22] Filed: Aug. 14, 1970

[21] Appl. No.: 63,839

Related U.S. Application Data

[60] Division of Ser. No. 694,470, Dec. 29, 1967, Pat. No. 3,357,265, which is a continuation-in-part of Ser. No. 402,118, Oct. 7, 1964, abandoned, which is a continuation-in-part of Ser. No. 432,258, Feb. 12, 1965, abandoned.

[52] U.S. Cl. ............................161/160, 161/161, 161/165, 161/252, 161/254, 264/47, 264/171
[51] Int. Cl. ....................B32b 3/26, B32b 7/00, B32b 27/08
[58] Field of Search..................161/160, 161, 165, 252, 254; 264/47, 171

[56] References Cited

UNITED STATES PATENTS

| 3,299,192 | 1/1967 | Lux | 264/48 |
| 3,444,031 | 5/1969 | Schrenk | 264/171 |
| 3,576,707 | 4/1971 | Schrenk et al. | 161/165 |

*Primary Examiner*—William J. Van Balen
*Attorney*—Griswold & Burdick, Richard G. Waterman and Robert B. Ingraham

[57] ABSTRACT

Plastic film or sheet having a plurality of layers is formed by deforming a flowing stream having layers of diverse thermoplastic material to provide a sheet or film having a laminar structure. Alternating foamed and unfoamed layers are obtained.

5 Claims, 9 Drawing Figures

PATENTED FEB 29 1972

3,645,837

INVENTORS.
Douglas S. Chisholm
BY Walter J. Schrenk

Robert B Ingraham
AGENT 3,645,837

LAMINATES

This application is a divisional application of our copending application Ser. No. 694,470, filed Dec. 29, 1967, now U.S. Pat. No. 3,557,265, which in turn is a continuation-in-part of our earlier filed application, Ser. Nos. 402,118, filed Oct. 7, 1964, now abandoned, and 432,258, filed Feb. 12, 1965, also now abandoned.

This invention relates to laminates, and more particularly relates to multilayer laminates prepared from thermoplastic materials.

It is well known in the art to prepare laminates of various heat-formable materials wherein the properties of the various components of the laminate contribute to the final properties of the laminated structure. Many of these laminates are prepared by forming the individual components and subsequently combining them by means of heat, pressure, adhesives and the like. Certain composite articles are formed by the coextrusion or simultaneous extrusion of two or more diverse materials. However, such techniques known to the art are not well suited for the preparation of multilayer laminates wherein more than two or three layers of material are combined in the final product. In certain coextrusion operations, particularly where thin sheets or laminated articles are prepared, there is much difficulty in obtaining a uniform composition of the product. That is, the thickness of the various lamina making up the composite article may vary, thus imparting undesired and nonuniform characteristics to the resultant product. Furthermore, the number of layers of material in conventional operations is generally limited severely by known die configurations or requires laborious layup or combination. Many foam plastic or synthetic thermoplastic resinous materials are known and commercially used for a variety of applications. Many of these foamed materials lack high physical strength at relatively low bulk density. Frequently they are employed in sandwich structures as cores and oftentimes as structural elements. Frequently, many of the economically desirable foam plastic materials are inadequate for structural applications where they are subjected to vibration, impact and the like. Many of such foam plastic sheets must be affixed by means of adhesives or like techniques wherein the load is distributed over a relatively broad area. Often, when foam panels are employed as structural elements, horizontal shear deformation is a serious cause of failure. This phenomenon appears to be associated with cell size of the foam and the thickness of the panel. Such foams oftentimes readily puncture and frequently split and crumble. When subjected to undue stress, the foams frequently crack and the crack propagates rapidly to result in failure of the element.

It is an object of this invention to provide a plastic foam structure having improved resistance to horizontal shear failure, improved puncture resistance, improved resistance to splitting, crumbling and improved impact resistance and toughness.

It is a further object of this invention to provide an improved laminate comprising a plurality of lamina having the lamina parallel to the major surfaces of the sheet.

Composite foam articles are provided in accordance with the present invention by a method which comprises extruding a plurality of heat-plastified streams of a nonexpandable thermoplastic resinous material, extruding a plurality of heat-plastified streams of an expandable thermoplastic resinous material in generally parallel alternating relationship within a configuration so as to form a main stream comprising a plurality of generally parallel layers of heat-plastified nonexpandable and heat-plastified expandable thermoplastic resinous material, expressing the composite stream from the configuration and causing the expandable material to expand.

The article of the present invention comprises an expanded cellular thermoplastic resinous body comprising at least five layers, and beneficially, from about 10 to 1,000 layers, wherein said layers are bonded to each other, and alternate layers comprise solid thermoplastic resinous film having a thickness of from about 10 microns to about 10 mils, the remaining layers being comprised of an expanded cellular thermoplastic resinous foam, the layers being in generally parallel relationship to each other.

Articles of the present invention are prepared by employing apparatus which comprises in cooperative combination a housing defining at least one cavity therein and adapted to receive at least a first and second heat-plastified thermoplastic stream, distribute the streams into a plurality of smaller streams, the smaller streams being in generally alternate arrangement with smaller streams from the first stream, being in alternating arrangement with the smaller streams from the second stream, a housing defining a passageway, the passageway having an entrance and an exit, the entrance having a first axis and a second axis, the exit having a first axis and a second axis, the first axes of the entrance and the exit being coplanar and the second axes of the entrance and the exit being coplanar, the first and second axes of the entrance and the exit being disposed generally normal to each other, the first axis of the entrance being the major axis and the second axis of the entrance being the minor axis, the first axis of the exit being the minor axis and the second axis of the exit being the major axis, the passageway being so constructed and arranged so as to permit streamline flow of a fluid therein and the length of the first axis of the major entrance being substantially greater than that of the first axis of the exit.

These features and other benefits and advantages in accordance with the present invention will become more apparent from the following specification when taken in connection with the drawing wherein.

Figure 1:
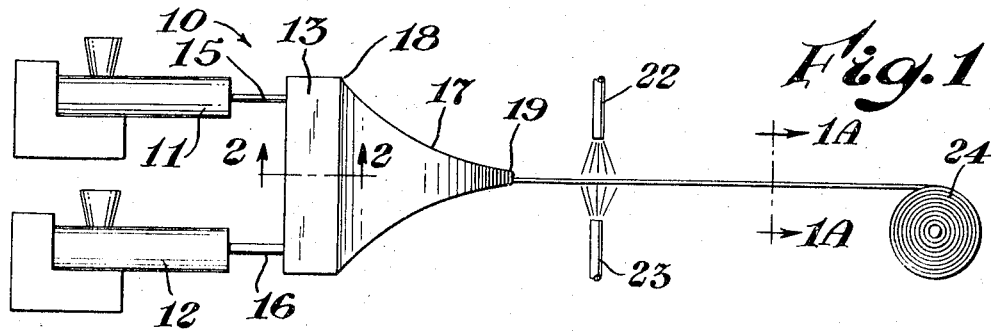
FIG. 1 is a schematic representation of a simplified apparatus showing an enlarged section of the product thereof.

In FIG. 1 there is illustrated an apparatus generally designated by the reference numeral 10. The apparatus 10 comprises in cooperative combination a first extruder 11, a second extruder 12, a distribution manifold 13 in full communication with the extruder 11 by means of a conduit 15 and in communication with the extruder 12 by means of a conduit 16. A transition piece 17 having an inlet or first opening 18 and a second or outlet opening 19 is in communication with the discharge of the manifold 13. A laminated film 20 issues from the discharge opening 19. Adjacent the opening 19 are cooling means 23 which reduce the temperature of the laminate film or sheet 20 to a temperature below the thermoplastic temperature thereof. The film or sheet 20 is wound onto a takeup means or roll 24. An enlarged portion 20a of the film 20 is shown depicting a plurality of lamina 25 and 26 of material from the extruders 11 and 12, respectively.

Figures 1A, 1B:
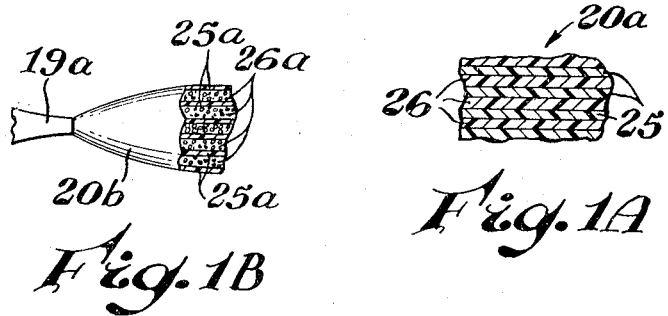
FIG. 1A is a schematic enlarged sectional view of the sheet 20 taken along the line 1A—1A of FIG. 1.
FIG. 1B is a schematic representation of an alternate embodiment.

In FIG. 1A there is depicted a schematic cross-sectional representation of the sheet 20 taken along the line 1A—1A of FIG. 1 showing a plurality of parallel first lamina or layers 25 interdigitated with a plurality of layers 26.

In FIG. 1B there is schematically depicted an alternate embodiment. A discharge opening 19a of the die is shown extruding a partially cutaway composite sheet 20b having layers 25a of an unfoamed material and layers 26a of a foamed material. The unfoamed layers 25a are interdigitated with the foamed layers 26a.

Figure 2:
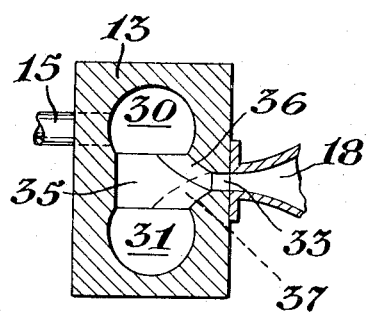
FIG. 2 is a sectional view through a distribution manifold of the apparatus of FIG. 1.

In FIG. 2 there is illustrated a sectional view of the manifold 13. The manifold 13 comprises a first major passageway 30 in communication with the conduit 15, a second major passageway 31 in communication with the conduit 16 (not shown), an extrusion slot or orifice 33 and a distribution block 35. The distribution block 35 defines a plurality of passageways 36 and a plurality of passageways 37. The passageways 36 provide communication between the first major passageway 30 and the extrusion orifice 33. The passageways 37 provide communication between the second major passageway 31 and the extrusion orifice 33. The passageways 36 and 37 are so constructed and arranged that they alternate in the distribution block and provide interdigitated streams of the material flowing from the first and second major passageways 31 to the extrusion orifices 33.

Figure 3:
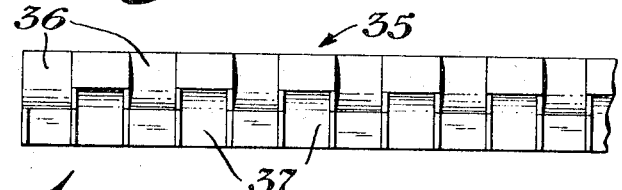
FIG. 3 shows a view of a distribution block employed in the manifold.

In FIG. 3 a front partial view of the distribution block 35 is shown illustrating the relationship between the passageways or channels 36 and 37 illustrating the interdigitated discharge of the thermoplastic materials.

Figure 4:
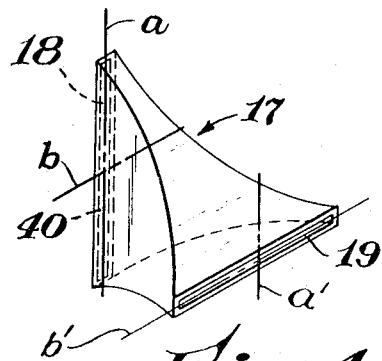
FIG. 4 is a schematic isometric representation of a transition piece as utilized in the apparatus of FIG. 1.

In FIG. 4 there is illustrated an isometric representation of a transition piece 17 having an inlet opening 18 and an outlet opening 19. A passageway 40 provides full communication between the inlet and outlet openings and permits streamline flow of a liquid from the opening 18 to the opening 19 without rotation of the flow lamina. The inlet opening 18 has a first or major axis $a$ and a second or minor axis $b$. The outlet opening 19 has a first axis $a'$ and a second axis $b'$. The axes $a$ and $a'$ are generally coplanar and the axes $b$ and $b'$ are generally coplanar. The transition piece of FIG. 4 is an exponential transition piece of constant cross-sectional area wherein its length is arbitrarily selected and the central portion has a square cross section having a length $l$, $b$ and $h$ are the desired width and height, respectively, of one of the openings. The equation of the outline of the transition section such as is seen in FIG. 1 if a $z$-axis is assumed to run vertically is:

$$z = \sqrt{bh/2} \, (h/b)^{x/l}$$

The equation for a line drawn centrally through the conduit and corresponding to the outline in a plane 90° to the observed plane of FIG. 1 is:

$$y = \sqrt{bh/2} \, (h/b)^{x/l}$$

Figure 5:
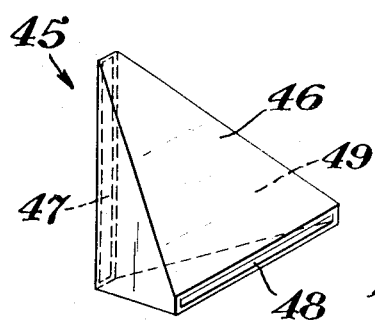
FIG. 5 is an alternate configuration of a transition piece.

The exponential transition section is particularly advantageous and beneficial if uniform flow rate within the transition piece is to be maintained. For many purposes a transition piece such as is illustrated in FIG. 5 is adequate. A transition piece of FIG. 5 generally designated by the reference numeral 45 comprises a housing 46 defining an inlet passage 47, an outlet passage 48 and an internal interconnecting channel 49 so constructed and arranged so as to permit substantially streamlined flow of material entering the passageway 47 and being discharged from the opening 48.

Figure 6:
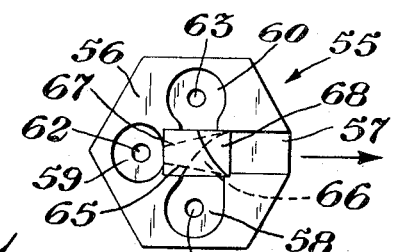
FIG. 6 is an alternate embodiment of a manifold.

In FIG. 6 there is illustrated an alternate configuration of a manifold generally designated by the reference numeral 55. The manifold 55 comprises a housing or body 56 having defined therein an extrusion orifice 57, first, second and third major passageways 58, 59 and 60, respectively, which are in communication with thermoplastic material supply conduits 61, 62 and 63, respectively. A distribution block 65 is disposed within the body 56 and defines a plurality of passageways 66 providing communication between the first major passageway 58 and the extrusion aperture 57, a plurality of passageways 67 providing communication between the major passageway 59 and the extrusion opening 57, a plurality of passageways 68 providing communication between the third major passageway 60 and the extrusion orifice 57. The passageways 66, 67 and 68 are alternately arranged in the distribution block 65.

Figure 7:
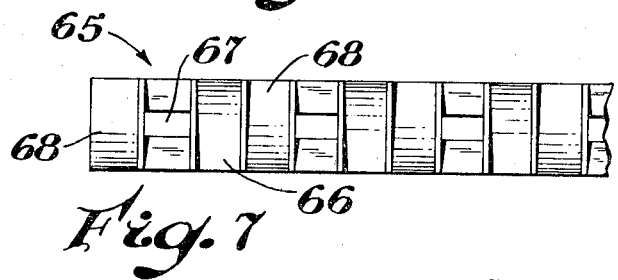
FIG. 7 is a view of a portion of a feed port block for use in the manifold of FIG. 6.

In FIG. 7 a front view of a portion of the distribution block 65 is shown depicting the relationship between the passageways 66, 67 and 68. Each of the passageways terminate in an opening substantially commensurate with the width of the extrusion passage 57. The embodiment of FIG. 6 is particularly advantageous when it is desired to prepare a laminate having three components and a plurality of layers.

In operation of the apparatus, thermoplastic resinous material in a heat-plastified condition is extruded from the extruders 11 and 12, passed into the manifold 13 to the passageways 30 and 31, respectively. The heat-plastified material from the passageway 30 flows to the extrusion orifice 33 by way of the passageways 36. The material from the extruder 12 flows into the passageway 31 and is discharged into the orifice 33 in interdigitating relationship with the material from the extruder 11. Thus, a striped sheet or stream is formed wherein the diverse materials extend from one major surface to the opposite major surface. On passing into the transition section, the extruded sheet in effect is squeezed or reduced (in width) and expanded in a direction corresponding to its thickness until, on emerging from the outlet, the portion of the sheet originally representing the edge is now a major surface or the width and that which had heretofore been the thickness of the sheet is now the width. As the transition piece permits linear or streamline flow, the various components are repositioned in such a manner that a number of thin layers of material in the form of a composite sheet are obtained without the necessity of employing a plurality of slot dies. The relative thickness of the various layers is readily controlled by varying the quantity of material provided to the manifold by the extruders. Thus, it is possible to have the various materials present in the desired proportion. Due to the relatively large size of the various feed ports defined in the distribution block, control of the thickness of the various layers is readily accomplished without the necessity of maintaining the extremely high dimensional tolerances that are necessary when conventional film and sheeting dies are utilized to prepare laminates. The embodiment of FIGS. 6 and 7 are readily utilized by employing the required number of streams of thermoplastic resinous material to provide the desired laminate. The foamed laminate of FIG. 1B is readily prepared by employing a foamable or expandable composition as feed to the extruder 11 or 12, as desired.

Such laminated foam structures may be prepared in the form of a tube by employing a plurality of concentric extrusion orifices within a die to provide the desired number of layers, or alternately by employing apparatus such as is disclosed in U.S. Pat. No. 3,131,910, which describes a mixing apparatus having a number of layers spirally disposed within a stream. A similar device is also illustrated in U.S. Pat. No. 3,127,152. Another apparatus which is useful to generate layers is shown in U.S. Pat. No. 3,176,965. A relatively thorough discussion and theoretical analysis of mixers utilizing rotation of a conduit relative to a stream flowing therethrough and of fluids in an annular channel are set forth in the American Society of Mechanical Engineers, publication No. 62-WA-336, "Continuous Mixing of Very Viscous Fluids in an Annular Channel," by W. J. Schrenk, K. J. Cleereman and T. Alfrey, Jr.; and publication No. 63-WA-303, "Mixing of Viscous Fluids Flowing Through a Rotating Tube," by W. J. Schrenk, D. S. Chisholm and T. Alfrey, Jr. The methods and devices of the foregoing references are all directed toward the preparation of homogeneous mixtures by providing a plurality of layers and decreasing the thickness of the layers to the vanishing point.

In the practice of the present invention such devices are used to generate layers of a desired and predetermined thickness and not to produce a homogeneous or a substantially homogeneous mixture. For example: the flow diverters of U.S. Pat. Nos. 3,051,452 and 3,051,453 are readily employed in sufficient numbers to produce the desired number of layers, whereas the rotating mixers described in U.S. Pat. Nos. 3,127,152 and 3,131,910 and the American Society of Mechanical Engineers publications are rotated only at a sufficient rate to generate the desired number of layers. If such mechanical working sections are employed to produce a homogeneous mixture of the diverse streams, the benefits and advantages of the present invention are entirely lost. Such mixers, when operated at less than optimum mixing speeds, produce a layered stream which is then fed to an extrusion die of the desired configuration, such as circular, annular or flat sheet. The layers may be disposed in a helical pattern if a tubing die is employed, or in a flattened helix if a sheeting die is employed.

No particular difficulties are encountered in preparing such laminates. The extrusion conditions employed are substantially those which may be employed for the material alone which forms the outer surface of the sheet. Thus, the temperature of the transition section or die 17 should be about the temperature required for the extrusion of the material forming the outermost layer of the laminate. For example: if a multilayer laminate having the construction ABABAB...ABA is being prepared, wherein A and B represent different polymeric materials, the die temperature usually should be that required for the material A. As the heat transfer between viscous liquids such as heat-plastified synthetic thermoplastic resinous materials is relatively poor, great latitude is obtained in the extrusion conditions for the material B. Further, because of the presence of a nonexpanded material, the foam layers tend to expand in the direction of the thickness rather than isometrically. Generally, for many structural applications it is desirable to employ a relatively rigid foam such as foamed polystyrene and foams of like materials which have a relatively low elongation before break; that is, below about 10 percent, and a relatively extensible material as the solid lamina, such as polyethylene having an elongation well over 100 percent. Such a laminate provides desirable physical properties of both the foam which contributes rigidity and of the softer solid layered material which contributes high impact resistance. Alternately, oftentimes it is desired to have a foam sheet having somewhat resilient properties in the transverse direction and a relatively rigid skin such as a tube obtained, for example, by employing a laminate having a plurality of layers of foamed polyethylene and a plurality of unexpanded layers of a more rigid material such as polyvinylchloride, polymethylmethacrylate, polystyrene and the like. In cases where a rigid foam is employed, that is, a foam from a polymer having a relatively low elongation before rupture, the use of a more extensible material contributes greatly to the shear strength which is particularly valuable where such elements are employed as load-bearing members. Foam-containing laminates in accordance with the present invention generally are most advantageous when the unexpanded layers are relatively thin, that is, below about 2 to 3 mils, and as low as about 0.25 micron. As the thinner films are employed, the degree of reinforcement appears to be substantially greater with a subsequent improvement in the resultant physical properties.

Employing apparatus generally similar to the apparatus 10 of FIG. 1, equal quantities of polystyrene and polymethylmethacrylate are extruded at a rate of about 15 pounds per hour into a sheet about 4 inches in width and about one-eighth inch in thickness. The sheet consists of 125 layers alternately of polystyrene and polymethylmethacrylate. On microscopic examination, the layers are determined to be substantially parallel to the surfaces of the sheet and of uniform thickness. The resultant sheet is more flexible and has higher impact resistance than a like sheet of polystyrene or polymethylmethacrylate.

The foregoing example is repeated employing polystyrene in combination with a green tinted nylon. Similar results are obtained. Beneficial laminates are also prepared in accordance with the invention employing polypropylene-polyvinylchloride; polypropylene-polystyrene; ethyl cellulose-polystyrene; polyethylene-polystyrene; polypropylene-polyethylene; polyvinyl-chloride-saran (copolymer of vinyl chloride and vinylidene chloride), etc. As is evident, the relative thicknesses of the like material are proportional to the amount of material issuing from the appropriate passageway or feed port in the die. Thus, by varying the dimensions of the feed ports, heavier or thicker layers may be employed at desired locations within the film.

In a manner similar to the foregoing illustration, a 125-layer composite is prepared from polyethylene and expandable polystyrene granules. The feed block corresponding to the block 35 of FIGS. 2 and 3 is so constructed and arranged as to provide a total of 125 streams, 63 of the streams coming from an extruder supplying 10 parts by weight per hour of a polyethylene having a temperature of about 330° F. and the remaining 62 streams being provided by an extruder forwarding 90 parts by weight per hour of a granular polystyrene containing about 6 weight percent pentane. The resultant foam laminate has outer surfaces of polyethylene, 61 inner layers of polyethylene and 62 layers of expanded polystyrene. On cooling of the extruded foam to room temperature, it is found to be extremely tough, of high impact resistance, excellent puncture resistance; on bending it is very difficult to break and does not exhibit the rapid crack propagation shown by polystyrene foam of the same dimension; shows high resistance to shear failure in the plane of a sheet and is resistant to splitting, crumbling and exhibits excellent toughness.

When the foregoing procedure is repeated employing polyvinylchloride in place of polyethylene, a generally similar tough laminated sheet is produced which is fire retardant to a degree substantially greater than one would normally expect from thermoplastic resinous compositions of similar chlorine content. Thus, fire retardant or resistant foamed laminates may be readily prepared employing materials such as polyvinylchloride and vinylidene chloride copolymers.

In a manner similar to the foregoing examples, other composite sheets are readily prepared employing expandable polystyrene, expandable polyethylene, expandable polyvinylchloride, expandable polymethylmethacrylate and the like with expanded polyethylene, expanded polystyrene and the like.

As is apparent from the foregoing specification, the method and apparatus of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A laminated article which comprises
    an expanded cellular thermoplastic resinous body having at least 5 layers, the layers bonded in contiguous relationship to adjacent layers,
    alternate layers comprising a solid thermoplastic resinous film having a thickness of from about 10 microns to about 10 mils,
    the remaining layers comprising an expanded cellular thermoplastic resinous foam, the layers being in generally parallel relationship to each other.

2. The article of claim 1 wherein there are from about 10 to 1,000 layers.

3. The article of claim 1 wherein the major surfaces are layers of solid thermoplastic resinous film.

4. The article of claim 1 wherein the solid thermoplastic resinous film has a high elongation before breaking relative to the elongation before breaking of the foam component.

5. The article of claim 4 wherein the solid polymer is polyethylene and the expandable cellular resin is polystyrene.

* * * * *